US008629651B2

(12) United States Patent
Guccione et al.

(10) Patent No.: US 8,629,651 B2
(45) Date of Patent: Jan. 14, 2014

(54) PORTABLE WIRELESS CHARGING DEVICE

(75) Inventors: Darren S. Guccione, Wheaton, IL (US); Craig B. Lurey, El Dorado Hills, CA (US); Lourans Aoraha, Wheeling, IL (US)

(73) Assignee: Callpod, Inc., Chicago, IL (US)

( * ) Notice: Subject to any disclaimer, the term of this patent is extended or adjusted under 35 U.S.C. 154(b) by 699 days.

(21) Appl. No.: 12/768,293

(22) Filed: Apr. 27, 2010

(65) Prior Publication Data
US 2011/0260681 A1 Oct. 27, 2011

(51) Int. Cl.
*H02J 7/00* (2006.01)
*H02J 7/02* (2006.01)

(52) U.S. Cl.
USPC ........... 320/108; 320/107; 320/111; 320/113; 320/114; 320/115

(58) Field of Classification Search
CPC ...................................... H02J 7/025
USPC .......................................... 320/108
See application file for complete search history.

(56) References Cited

U.S. PATENT DOCUMENTS

| 4,727,306 | A |   | 2/1988  | Misak et al.        |         |
|-----------|---|---|---------|---------------------|---------|
| 5,357,185 | A |   | 10/1994 | Chen                |         |
| 5,396,162 | A |   | 3/1995  | Brilmyer            |         |
| 5,552,953 | A | * | 9/1996  | Meyerdirks et al. ......... | 361/93.1 |
| 5,565,756 | A |   | 10/1996 | Urbish et al.       |         |
| 5,587,645 | A |   | 12/1996 | Sciammarella et al. |         |
| 6,225,708 | B1 |   | 5/2001  | Furukawa et al.     |         |
| 6,683,438 | B2 | * | 1/2004  | Park et al. ................... | 320/108 |
| 6,922,039 | B2 |   | 7/2005  | King                |         |
| 7,638,971 | B2 |   | 12/2009 | Guccione et al.     |         |
| 8,164,222 | B2 | * | 4/2012  | Baarman ........................ | 307/104 |
| 8,183,828 | B2 | * | 5/2012  | Tanabe .......................... | 320/108 |
| 8,188,709 | B2 | * | 5/2012  | Onishi et al. .................. | 320/108 |
| 8,204,531 | B2 | * | 6/2012  | Jin et al. ....................... | 455/522 |
| 2005/0285562 | A1 |   | 12/2005 | Wu              |         |
| 2009/0267562 | A1 |   | 10/2009 | Guccione et al. |         |
| 2011/0074342 | A1 | * | 3/2011 | MacLaughlin ............... | 320/108 |

FOREIGN PATENT DOCUMENTS

WO   2008118611 A9   10/2008
WO   2009132193 A3   10/2009

OTHER PUBLICATIONS

Duracell product page of a power charger from Duracell.com website [online] [retrieved on Apr. 26, 2011], 1 page. Retrieved from <URL: http:/www.duracell.com/en-US/product/mygrid-kits.jspx>.
Epowerpad product page of a power pad from epowerpad.com website [online] [retrieved on Apr. 26, 2011], 1 page. Retrieved from <URL: http://www.epowerpad.com>.

* cited by examiner

*Primary Examiner* — Edward Tso
*Assistant Examiner* — Ahmed Omar
(74) *Attorney, Agent, or Firm* — Blanchard & Associates

(57) ABSTRACT

A wireless charging device includes a charging battery, a transmitter coupled to the charging battery, and a controller coupled to the charging battery and the transmitter. The controller is configured to direct power from the charging battery to the transmitter and wirelessly transmit the power to a receiver. The wireless charging device also includes a housing, wherein the charging battery, the transmitter, and the controller are disposed at least partly within the housing.

18 Claims, 4 Drawing Sheets

PORTABLE WIRELESS CHARGING DEVICE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention is directed to devices and methods to transfer power wirelessly to other devices and, more particularly, to such devices and methods that are capable of being self-powered, for example, by one or more batteries.

2. Background of the Invention

Wireless power transmission, such as, by magnetic coil induction, is used in a variety of applications to charge products including, but not limited to, electric-powered transportation carts, power tools, and cooking appliances. Wireless power chargers for mobile devices have also recently entered the market. In one example, these chargers use a charging mat that must be plugged into an electrical wall socket to transmit power wirelessly. Generally, the mobile device, such as, a cell phone or smart phone, is provided with a separate cover and battery connector, in addition to the usual device structures. When charging is to be undertaken, the separate cover is coupled to the battery via the battery connector. The user thereafter places the device onto the charging mat and the mat is energized. When the device is placed in the proper location on the charging mat, a receiver in the cover receives the wirelessly transmitted power and the power is delivered to the device battery through the battery connector to charge the mobile device.

Various drawbacks have been identified with prior wireless power chargers. For example, such chargers lack portability because they are generally large and bulky and are not easily placed in a user's pocket, purse, briefcase, etc. Further, such chargers require a connection to an external power source, e.g., a connection to an A/C power source from an electrical wall or car outlet. This requirement has obvious drawbacks since an external power source is not always available when needed or desired, especially in today's mobile society. Chargers that require a connection to an external power source are also energy inefficient because they typically draw power from the external power source at all times even when a device is not being charged.

Further, the use of a separate cover and battery connector to charge a device may be considered undesirable because of the need to remove any existing cover from the device and replace the cover with the separate cover and battery connector, which, in many cases, does not adequately protect the mobile device if the device is dropped.

SUMMARY OF THE INVENTION

In one embodiment, a wireless charging device includes a charging battery, a transmitter coupled to the charging battery, and a controller coupled to the charging battery and the transmitter. The controller is configured to direct power from the charging battery to the transmitter and wirelessly transmit the power to a receiver. The wireless charging device also includes a housing, wherein the charging battery, the transmitter, and the controller are disposed at least partly within the housing.

In another embodiment, a wireless charging system includes a wireless charger having a first battery, a transmitter coupled to the first battery, and a first controller coupled to the first battery and the transmitter. The first battery, the transmitter, and the first controller are further disposed within a housing. The wireless charging system further includes a second battery and a receiver coupled to the second battery. The first controller is configured to direct power from the first battery to the transmitter and wirelessly transmit the power to the receiver. The receiver receives the wirelessly transmitted power to charge the second battery.

In yet another embodiment, a method of wirelessly charging a device battery, includes the steps of providing a wireless charger that includes an internal power supply and a transmitter and directing power from the internal power supply to the transmitter. The method further includes the steps of wirelessly transmitting power from the transmitter, receiving the wirelessly transmitted power at a receiver associated with a device, and directing the received power to operate the device.

BRIEF DESCRIPTION OF THE DRAWINGS

Other aspects and advantages of the present invention will become apparent upon reading the following detailed description and upon reference to the drawings in which.

DETAILED DESCRIPTION

Figure 1:
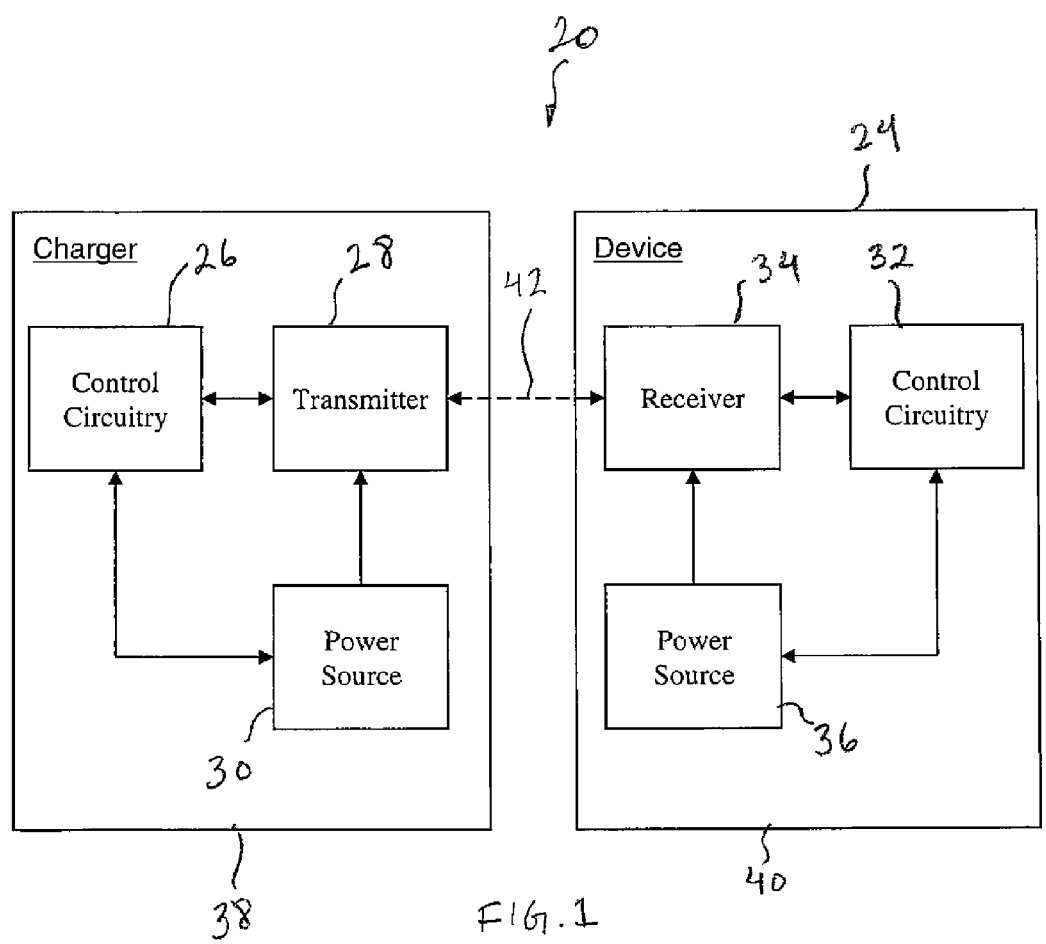
FIG. 1 illustrates a block diagram of a wireless charging system according to one embodiment including a charger and a device to be charged.

The following description discloses wireless chargers and wireless charging systems and methods that address one or more of the drawbacks of prior charging systems. In one example, a wireless charger according to the present disclosure is configured to fit in a relatively small space, such as, a coat pocket, purse, travel bag, or briefcase. In another example, a charger is made truly portable by utilizing an internal power source instead of requiring a connection to an external power source during the charging process. The internal power source can be disposed of and replaced when the power source is depleted or can be rechargeable. In one example, a rechargeable battery is used, which can be coupled in any suitable fashion to an external power source, such as, an electrical wall outlet, a car outlet, an external battery, or any other power source, to recharge the internal power source. In another example, a fuel supply of the internal power source can be easily replenished to recharge the power source. In yet another example, the chargers and charging systems disclosed herein are adapted to charge a wide range of devices and battery types, such as devices that are compliant with standards set forth by the wireless power consortium ("WPC") or other similar devices that include a wireless power charging receiver. In one example, the wireless power charging receiver is integrated into the device via the device battery or otherwise integrated with or coupled to control circuitry of the device. The chargers and charging systems disclosed herein can wirelessly charge cell phones, smart phones, music players, sound recorders, cameras, GPS and other navigation units, wireless headsets, PDA's, etc. across any manufacturer brand, e.g., Motorola, Nokia, Apple, RIM, Sony, etc.

In other examples, the chargers disclosed herein include an indicator that displays a capacity level of an internal power source, a device placement or alignment indicator that lets a user know if a device to be charged is positioned properly with respect to the charger, and a voltage/current regulation and control system to ensure safe and optimal charging of a device. In yet further examples, the chargers disclosed herein include power management systems, such as, a sense circuit that is used to determine automatically when the charger should be in an active mode where it is wirelessly transmitting power and when it should be in a sleep mode and an on/off switch to allow a user to manually place the charger in active and sleep modes. In another example, the chargers disclosed herein include an auto positioning or alignment system that utilizes a magnet system, for example, to automatically bring a device to be charged into proper alignment with the charger. In yet another example, the chargers and devices include communication systems to communicate data wirelessly therebetween. For example, the data may include power parameters for a device, a charging status, a battery charge level, charger/device identification information, etc.

Referring now to the embodiment of FIG. 1, a wireless charging system 20 may generally include a charger 22 and a device 24 to be charged. In FIG. 1, the charger 22 includes a controller or control circuitry 26 coupled to a transmitter 28 and a power source 30. Further, the transmitter 28 may comprise a chip or any other suitable components and may also be coupled to the power source 30. Similarly, the device 24 includes a controller or control circuitry 32 coupled to a receiver 34 and a power source 36. In FIG. 1, the receiver 34 may comprise a chip or any other suitable components and is further coupled to the power source 36. However, in other embodiments, the components of the charger 22 and the device 24 may be modified and coupled together differently in any suitable manner without departing from the spirit of the present invention. For example, the transmitter 28 and the receiver 34 may be integrated into single chip packages or configured in any other known arrangement of transmitter/receiver components and circuitry.

The control circuitry 26, the transmitter 28, and the power source 30 of the charger 22 may be disposed partially or fully within a housing 38 or otherwise coupled thereto. Similarly, the control circuitry 32, the receiver 34, and the power source 36 of the device 24 may be disposed partially or fully within a housing 40 or otherwise coupled thereto. The power source 30 of the charger 22 and/or the power source 36 of the device 34 may include rechargeable batteries, e.g., nickel cadmium, lithium ion, nickel zinc, lead acid, or any other type of rechargeable or non-rechargeable battery, fuel cell, or known self-contained and routinely portable power source.

FIG. 1 illustrates a wireless power coupling 42 that transmits power between the transmitter 28 and the receiver 34. In typical settings for charging small mobile devices, e.g., cell phones, smart phones, PDA's, music players, sound recorders, portable gaming consoles, wireless headsets, GPS devices, etc., the wireless power coupling 42 is a known inductive coupling. In other contemplated examples, the wireless power coupling may utilize other known wireless power transfer methods, such as, radio, microwave, laser power transfer, and resonant energy transfer. Generally, with an inductive coupling, the transmitter 28 includes or is coupled to at least a primary transmitter coil and the receiver 34 includes or is coupled to at least a secondary receiver coil. The primary coil generates an electromagnetic field when power is applied thereto and the electromagnetic field induces a power flow in the secondary coil when the secondary coil is aligned properly in the electromagnetic field. The power flow in the secondary coil can then be used to power the device 24 and/or recharge the power source 36. The configuration of the primary and secondary coils, e.g., the number of turns of the coil around a core, the composition of the core, the composition of the coils (including wire gauge), the dimensions of the core and coils, etc., can be designed to provide an efficient wireless power transfer between the primary and secondary coils, as would be apparent to one of skill in the art.

The control circuitry 26 of the charger 22 is configured to control the operation of the charger 22, for example, by controlling the voltage and/or current supplied from the power source 30 to the transmitter 28 so that the electromagnetic field generated by the primary coil will efficiently induce appropriate voltage and current waveforms in the secondary coil. In other embodiments, the voltage and current supplied to the transmitter 28 can be controlled by other known power conditioning/regulating components. Similarly, the control circuitry 32 of the device 24 is configured to control the operation of the device 24, for example, by regulating and/or converting the voltage and/or current received by the receiver 34 to provide appropriate power levels to charge the power source 36 and other components of the device 24.

Figure 2:
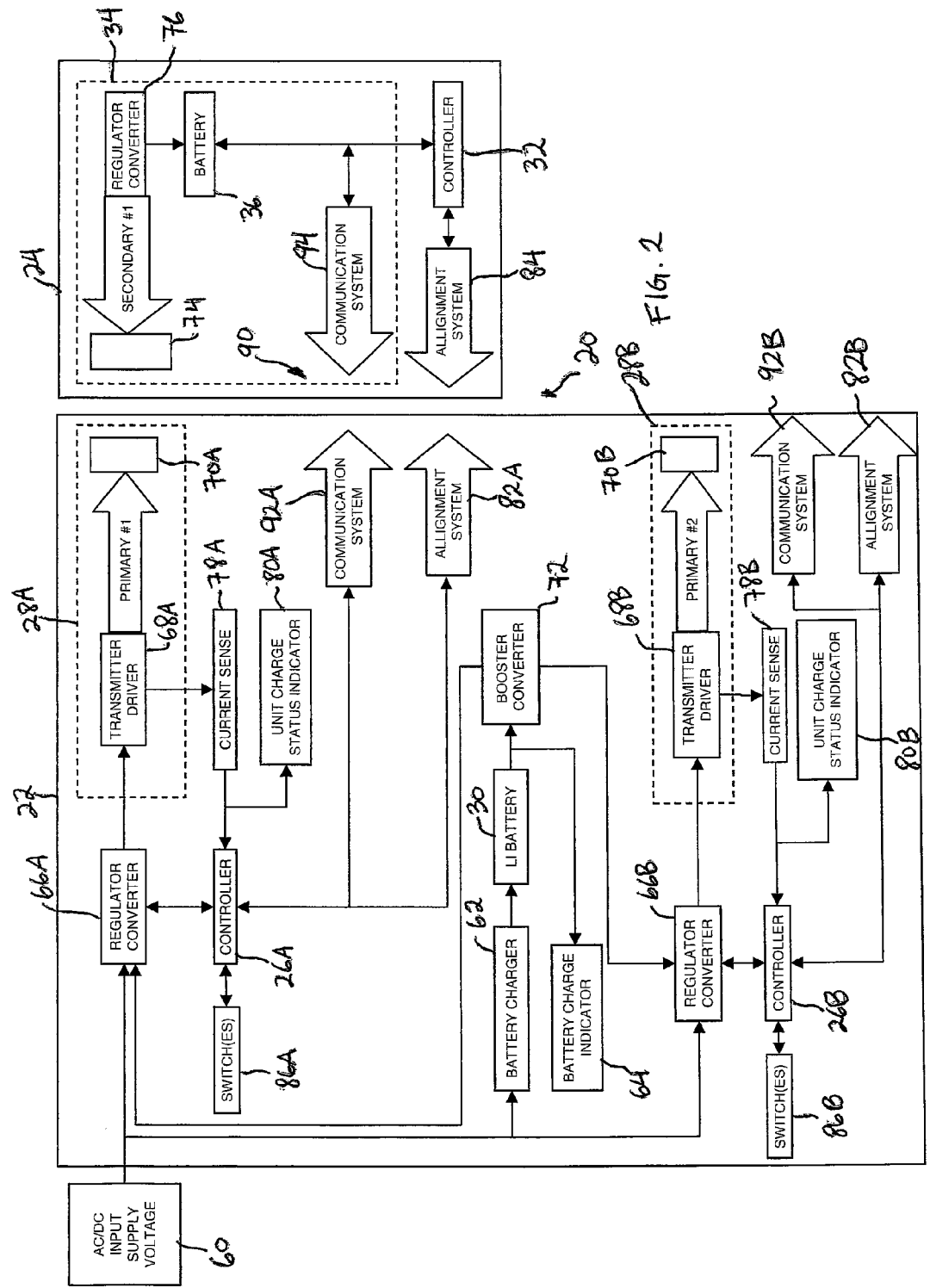
FIG. 2 illustrates a detailed block diagram of an example of a wireless charging system according to the embodiment of FIG. 1.

Referring more specifically to FIG. 2, the wireless charger 22 can be configured to support one or more wireless charging ports, which are illustrated generally by the multiple transmitters 28A, 28B to charge multiple devices at the same time via primary coils 70A, 70B, for example. In another embodiment, a single transmitter 28 may be configured to charge multiple devices at the same time. More generally, one or more transmitters 28 may be configured to supply power to one or more primary coils 70 to charge one or more devices 24, as desired. The following description will focus on the operation of the transmitter 28A and various components associated therewith, which are denoted with the suffix "A" following the reference numeral. The operation of the transmitter 28B and various components associated therewith, which are similarly denoted with the suffix "B" following the reference numeral, is identical or similar to the operation of the transmitter 28A and its associated components, as would be apparent to one of ordinary skill in the art.

The charger 22 of FIGS. 1 and 2 can be used in a stationary mode and in a mobile mode. In the stationary mode, the charger 22 is connected to an external power source, e.g., an AC/DC input supply voltage 60 from an electrical wall outlet, a car outlet, an external battery, and the like. The supply voltage 60 is used to externally power the charger 22 and wirelessly transmit power via the transmitter 28A and the primary coil 70A. The supply voltage 60 also charges the internal power source 30, which in FIG. 2 is illustrated as a rechargeable lithium-ion battery. More particularly, the supply voltage 60 is coupled to a battery charger circuit 62, which modifies the power from the supply voltage 60, as necessary, to supply appropriate voltage/current input waveforms to charge the power source 30. The wireless charging system 20 of FIG. 2 also includes a battery charge indicator 64, which detects and provides an indication of the power capacity of the power source 30. In one example, the battery charge indicator 64 provides a visual indication of the power capacity, such as, on a small LCD screen or utilizing a series of LED's. However, in other examples, the battery charge indicator 64 can provide an indication of the power capacity in other ways, for example, audibly. In the present embodiment, when the charger 22 is connected to the supply voltage 60, the external supply voltage bypasses the internal power source 30 and takes precedence in powering the transmitter 28 while simultaneously charging the internal power source 30, if the power source 30 is not fully charged.

In the mobile mode, no supply voltage 60 is connected to the charger 22 and the charger is powered only by the internal power source 30. In either the stationary or the mobile mode, a voltage and/or current regulator/converter 66A provides appropriate voltage and current waveforms to the transmitter 28A. In the present embodiment, the controller 26A can be configured to determine whether the supply voltage 60 is coupled the charger 22 or otherwise supplying power to the regulator/converter 66A and to control the regulator/converter to provide power to the transmitter 28A either from the supply voltage 60 or the internal power source 30, as discussed above.

In one example, the voltage and current waveforms developed by the regulator/converter 66A are alternating waveforms that comply with WPC standards. In another example, the voltage is about 5 volts AC and the current is about 1 amp AC. However, these voltage and current waveforms can be modified in other embodiments without departing from the spirit of the present invention. The regulated power from the regulator/converter 66A is supplied to the primary coil 70A via the transmitter driver 68A and transmitted wirelessly to a secondary coil 74 coupled to the receiver 34. FIG. 2 also illustrates a booster/converter 72 that is coupled between the power source 30 and the regulator/converter 66A. In the mobile mode, the booster/converter 72 can be used to regulate and/or convert the power from the power source 30 before the regulator/converter 66 develops the appropriate voltage/current waveforms that are supplied to the transmitter 28. The controller 26A can further control the booster/converter 72 to develop appropriate voltage/current waveforms for the transmitter 28 only when the supply voltage 60 is not supplying power to the charger 22.

In FIG. 2, the receiver 34 receives the power developed by the secondary coil 74. A regulator/converter 76 may be coupled to the secondary coil 74 to develop appropriate voltage and/or current waveforms from the power induced in the secondary coil 74 so that the power source 36 is charged in a manner that desirably preserves battery life. In FIG. 2, the secondary receiver 74, the regulator/converter 76, and the battery 36 may be integrated into a single receiver structure or component 34. Various modifications can be made in other embodiments, for example, the receiver 34 can include integrated control circuitry 32, the battery 36 can be a separate element that is coupled to the receiver 34 in any suitable manner, the regulator/converter 76 may be omitted, and/or other components may be included with the receiver 34, as would be apparent to one of ordinary skill.

The charger 22 of FIG. 2 further includes a current sense circuit 78A that is coupled to the transmitter driver 68A to sense whether current is being drawn by the receiver 34. The controller 26 is also coupled to the current sense circuit 78A and monitors the current drawn by the receiver 34 to determine whether the power source 36 of the device 24 is fully charged or not. If the power source 36 is not fully charged, then the controller 26 is configured to enter an active charging mode. In the active charging mode, power is supplied to the transmitter 28A via the supply voltage 60 or the power source 30 to wirelessly transmit power from the primary coil 70A to the receiver 34, as described above. However, if the power source 36 is fully charged, then the controller 26 causes the charger 22 to enter a sleep mode to conserve the power source 30. In another embodiment, while in the sleep mode, a minimal power level is supplied to the primary coil 70A so that the current sense circuit 78A can be used to determine whether the receiver 34 of the device 24 is aligned with the transmitter 28A by detecting whether current is being drawn from the transmitter driver 68A. If the current sense circuit 78A detects the presence of the receiver 34, then the controller 26 can cause the charger 22 to enter the active charging mode to wirelessly transmit power to the receiver 34.

In FIG. 2, a unit charge status indicator 80A is coupled to the controller 26 and the current sense circuit 78A to provide an indication of the charge status of the system 20. For example, the charge status indicator 80A can be used to indicate that the charger 22 is in the active charging mode or in the sleep mode. Further, the charge status indicator 80A can serve a dual purpose by also providing an indication of whether a receiver 34 of the device 24 is properly aligned with the transmitter 28A. In one example, the charge status indicator 80A provides a visual indication of the charge/alignment status, such as, on a small LCD screen or utilizing a series of LED's. However, in other examples, the battery charge status indicator 80A can provide an indication of the status in other ways, for example, audibly.

FIG. 2 further illustrates a first portion 82A of an alignment system associated with the charger 22 and a second portion 84 of the alignment system associated with the device 24. In general, the alignment system functions to ensure proper alignment between the receiver 34 of the device 24 and the transmitter 28A of the charger 22. In one example, the first and second portions 82A, 84 of the alignment system utilize magnets that automatically bring the transmitter 28 and the receiver 34 into alignment when the magnets are in proximity to each other. In other embodiments, the first and second portions 82A, 84 of the alignment system can include mechanical corresponding lock-and-key features on the housings 38, 40 of the charger 22 and the device 24, respectively. In one embodiment, the optional alignment system may ensure full proper alignment so that power is transferred from the transmitter 28 to the receiver 34 in the most efficient manner. However, in other embodiments, the transmitter 28 and the receiver 34 may be in partial proper alignment and power may still be transferred, although, perhaps at less efficiency than when there is full proper alignment between the components.

Further, FIG. 2 illustrates one or more buttons or switches 86A coupled to the controller 26A. The switches 86A can be used to perform various functions, such as, providing an on/off switch for the entire charger 22 or one or more portions of the charger and/or instructing the charger 22 to provide an indication of the power capacity of the power source 30.

Still further, the wireless charging system 20 of FIG. 2 may also include a communication system 90 that facilitates communications between the charger 22 and the device 24. More particularly, FIG. 2 illustrates a first portion 92A of the communication system 90 associated with the charger 22 and a second portion 94 of the communication system associated with the device 24. In one embodiment, the communication system 90 allows the charger 22 and the device 24 to communicate data to each other wirelessly, e.g., through passive or active Radio-Frequency Identification ("RFID"), Near Field Communication ("NFC"), infrared or other optical data transfer, or other known methods. The data may include current/voltage levels or other power parameters for the transmitter 28, a charging status, a battery power level, charger/device identification information, etc. In one embodiment, the charger/device identification information can be used to identify devices 24 with compatible receivers 34 that are allowed to be charged by the charger 22. For example, if the identification information for the device 24 and/or receivers 34 does not match the identification information for the charger 22, then the charger will not wirelessly transmit power to the device 24. FIG. 2 shows the second portion 94 of the communication system 90 integrated as a part of the receiver 34. However, in other embodiments, the first and second portions 92A, 94 of the communication system 90 can be coupled to the charger 22 and the device 24, respectively, in any known manner without departing from the spirit of the present invention.

Referring back to the transmitter 28B, various components are shown associated therewith, for example, a controller 26B, a regulator/converter 66B, a transmitter driver 68B, a second primary coil 70B, a current sense circuit 78B, a unit charge status indicator 80B, a first portion of a second alignment system 82B, one or more switches 86B, and a first portion of a second communication system 92B. These various components may function similarly or identically to the components with similar reference numerals described above to charge the device 34 and/or to provide a charging area for a different device. Further, various modifications can be made to the transmitter 28B and the components associated therewith, as would be apparent to one of ordinary skill in the art. For example, the controller 26B may be omitted and the components associated with the transmitter 28B may be controlled by the controller 26A. Likewise, the switch(es) 86B may be omitted. Indeed, in one example, the transmitter 28B and some or all of the associated components may be omitted without departing from the spirit of the present invention. In yet another example, additional transmitters 28 and associated components may be added to the charger 22 to provide additional charging areas for other devices 34.

Figure 3:
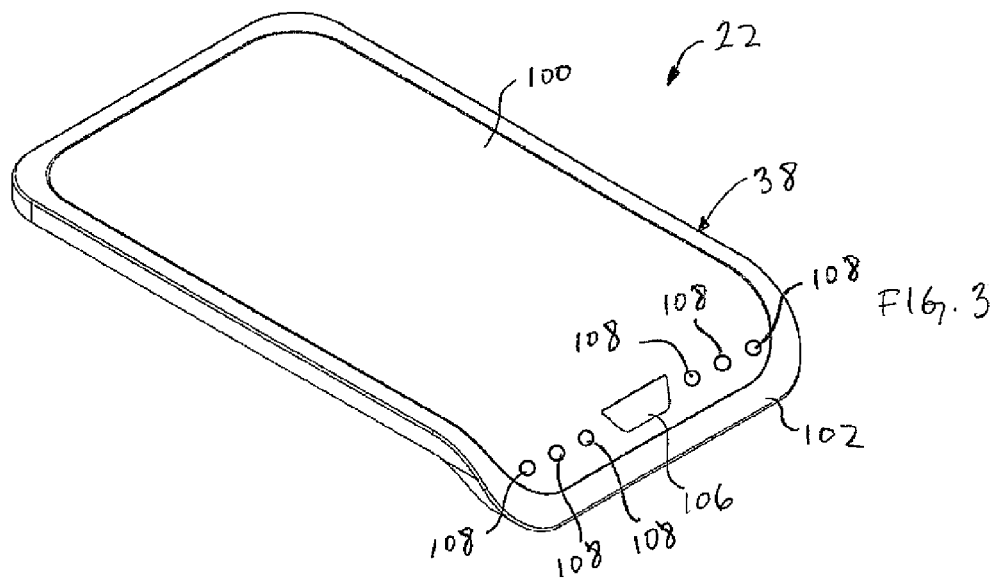
FIG. 3 illustrates a top isometric view of an example of a charger housing that partially or fully encloses the charger of FIG. 1.
Figure 4:
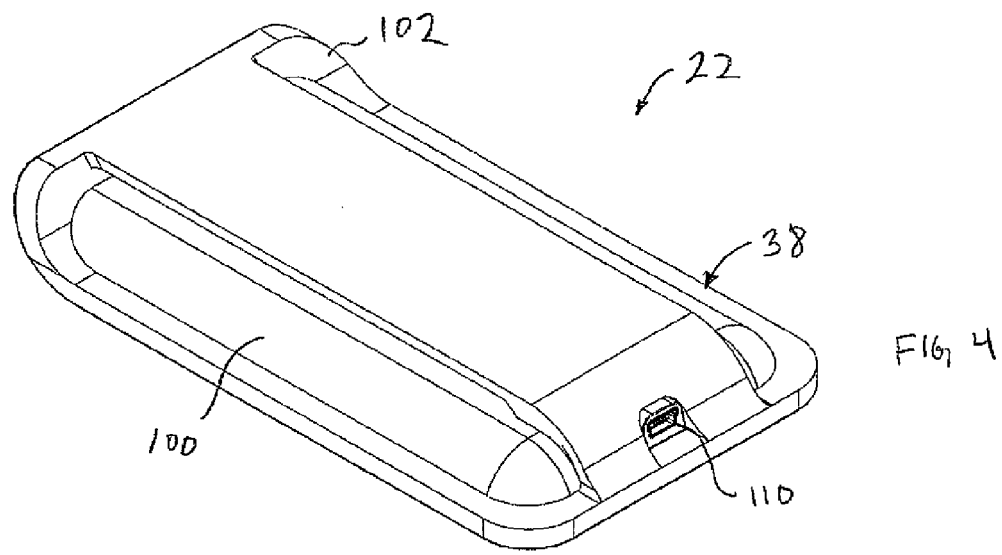
FIG. 4 illustrates a bottom isometric view of the charger housing of FIG. 3.
Figure 5:
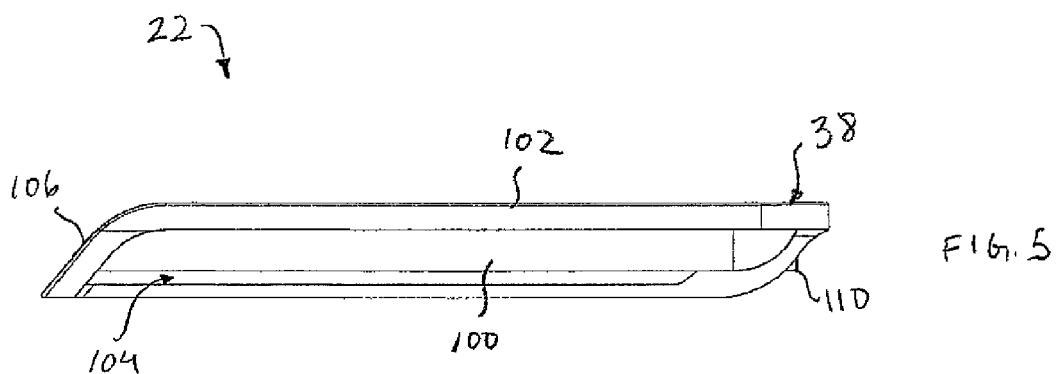
FIG. 5 illustrates a side elevational view of the charger housing of FIG. 3.

Referring now to FIGS. 3-5, one example of the charger 22 includes a housing 38 that can include first and second housing portions 100, 102, respectively. The housing 38, according to one embodiment, is about 5.8 inches (about 14.7 cm) in length, 3.4 inches (about 8.6 cm) in width, and about 0.7 inches (about 1.8 cm) in height. However, in other embodiments, the specific dimensions of the housing 38 can be modified to accommodate one or more devices 24 to be charged without departing from the spirit of the present invention. The electrical components shown generally in FIGS. 1 and 2 can be disposed within or can otherwise be functionally coupled in any appropriate fashion to the first housing portion 100. Further, the first housing portion 100 can be coupled to the second housing portion 102 in a manner to facilitate airflow around the first housing portion, which will reduce the likelihood that the electrical components will overheat. In FIG. 5, for example, a space 104 is provided between the first and second housings 100, 102 to allow airflow through the space 104 to cool the charger 22. The first and second housing portions 100, 102 can be integral pieces or separate.

The charger 22 of FIGS. 3-5 further includes a pushbutton or switch 106, indicator lights 108, and an electrical outlet connection 110. In various examples, the pushbutton or switch 106 can be the same or different than the switch(es) 86 of FIG. 2 and can function as a switch to turn the charger 22 on and off and/or as a power source indicator button that is pressed to provide an indication of the power capacity of the power source via the indicator lights 108. The indicator lights 108 can be the same or different than the indicators 64, 80 of FIG. 2 and can serve one or more functions, e.g., to provide a power capacity indication, a unit charge status indication, and/or an alignment indication. The electrical outlet connection 110 can be any suitable connection to allow an external power source to be coupled to the charger 22, for example, the power source 60 of FIG. 2.

According to one embodiment, the device 24 with the receiver 34 and the battery 36 is placed in a particular orientation on the charger 22 of FIGS. 3-5 to charge the battery 36, as described above. In another embodiment, the device 24 itself may be omitted and only the receiver 34 and battery 36 combination may be placed on the charger 22 to charge the battery.

Figure 6:
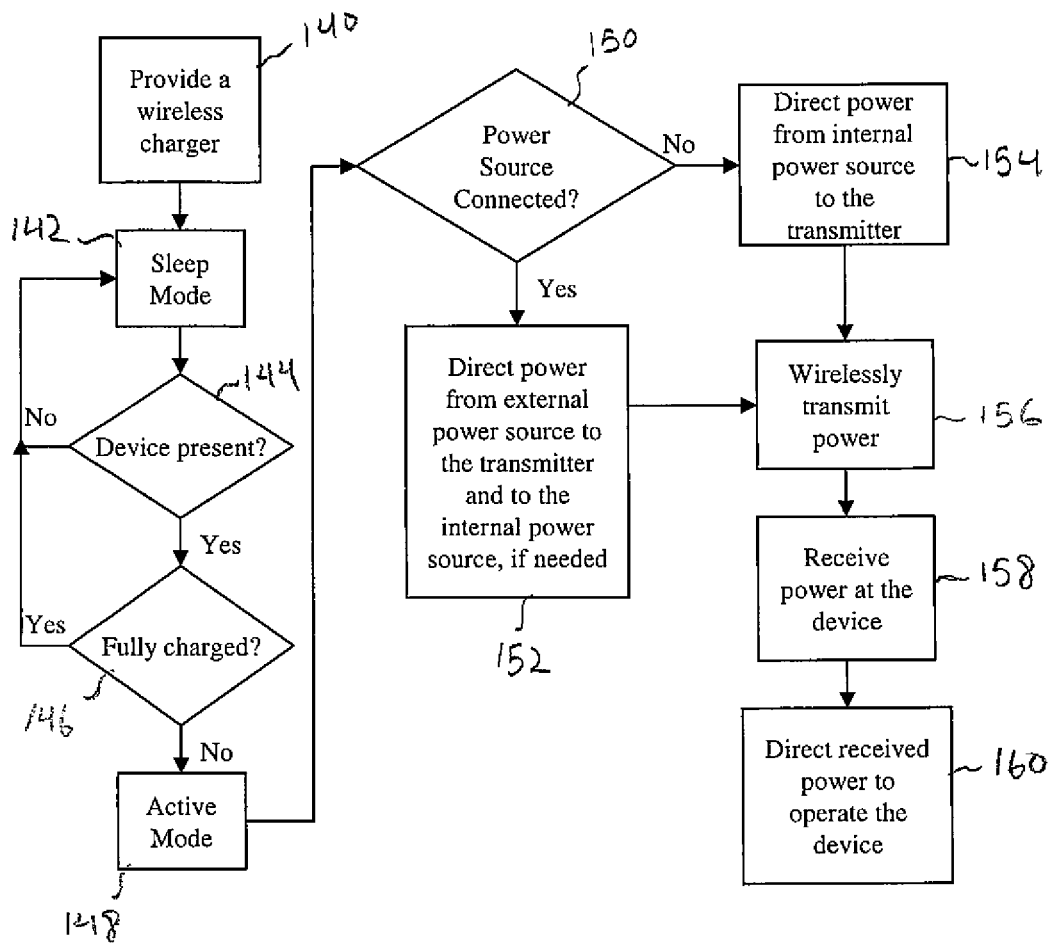
FIG. 6 is a flowchart of a wireless charging process implemented by the system of FIG. 1 or FIG. 2.

FIG. 6 illustrates a flowchart of processes that can be performed to wirelessly charge a device. Some of the processes of the flowchart can be implemented by suitable hardware and/or software in the control circuitry 26, 32 of the charger 22 and the device 24, as would be apparent to one of ordinary skill. In FIG. 6, the process begins at a block 140 to provide a wireless charger, such as, the charger 22 disclosed hereinabove with the internal power source 30. At a block 142, the charger 22 is initially in a sleep mode where the power source 30 is conserved. At a block 144, a decision is made to determine whether the device 24 is present, if not, then control passes back to the sleep mode of the block 142. If the device 24 is present, control passes to a decision block 146 to determine whether the device 24 is fully charged or not. If the device 24 is fully charged, control passes back to the sleep mode of the block 142. However, if the device 24 is not fully charged then control passes to a block 148 and the charger 22 is operated in an active mode.

After entering the active mode, a decision block 150 determines whether an external power source or supply voltage 60 is connected to the charger 24. If the supply voltage 60 is connected to the charger 24, control passes to a block 152 and power is directed from the supply voltage 60 to the transmitter 28 and simultaneously to the power source 30, if the power source 30 is not fully charged. If the supply voltage 60 is not connected to the charger 24, control passes to a block 154 and power is directed from the power source 30 to the transmitter 28. After the power is directed to the transmitter 28 from either the supply voltage 60 or the power source 30, control passes to a block 156 and power is wirelessly transmitted from the transmitter 28. At a block 158, the receiver 34 of the device 24 receives the power and, at a block 160, the received power is used to operate the device 24, e.g., by powering the power source 36 and other electrical components of the device 24.

Various modifications can be made to the flowchart of FIG. 6, for example, any of the decision blocks 144, 146, 150 can be continuously preformed to monitor any changes in status of the wireless charging system 20. Other modifications to the flowchart of FIG. 6 can be made without departing from the spirit of the present invention.

Other embodiments of the disclosure including all the possible different and various combinations of the individual features of each of the foregoing described embodiments are specifically included herein.

INDUSTRIAL APPLICABILITY

The wireless charging systems and methods disclosed herein are capable of charging a wide range of devices and battery types. Further, the charging systems and methods disclosed herein are truly portable by including an internal power source.

Numerous modifications to the present disclosure will be apparent to those skilled in the art in view of the foregoing description. Accordingly, this description is to be construed as illustrative only and is presented to enable those skilled in the art to make and use the disclosure and to teach the best mode of carrying out the same. The exclusive right to all modifications within the scope of this disclosure is reserved.

We claim:

1. A wireless charging device, comprising:
a charging battery;
a transmitter coupled to the charging battery;
a controller coupled to the charging battery and the transmitter to direct power from the charging battery to the transmitter and wirelessly transmit the power to a receiver, wherein the receiver is identified by the controller as one of a plurality of compatible receivers based on identification information exchanged wirelessly between the wireless charging device and the receiver;
a current sense circuit coupled to the transmitter and the controller, wherein the controller is configured to use data from the current sense circuit to determine if the receiver is properly aligned with the transmitter and to wirelessly transmit power from the transmitter to the receiver only if the receiver is at least partially properly aligned with the transmitter; and
a housing, wherein the charging battery, the transmitter, the controller, and the current sense circuit are disposed at least partly within the housing.

2. The device of claim 1, further comprising an electrical connection to receive power from an external power source, wherein the controller is configured to bypass the charging battery and direct power from the external power source to the transmitter and wirelessly transmit the power from the external power source to the receiver when the electrical connection is receiving power from the external power source.

3. The device of claim 2, wherein the controller is configured to direct power from the external power source to charge the charging battery while simultaneously directing power from the external power source to the transmitter.

4. The device of claim 1, further comprising a charging status indicator coupled to the controller to indicate if the receiver is drawing power from the transmitter.

5. The device of claim 1, further comprising a device placement status indicator coupled to the controller to indicate if the receiver is properly aligned with the transmitter.

6. The device of claim 1, further comprising a battery charge indicator coupled to the controller to indicate a battery charge level of the charging battery.

7. The device of claim 1, further comprising a switch coupled to the controller to turn the device on and off, and wherein the charging battery is a rechargeable battery and the transmitter utilizes magnetic coil induction to transmit power wirelessly.

8. The device of claim 1, wherein the housing further includes first and second portions, and wherein the charging battery, the transmitter, and the controller are disposed within the first portion and the first portion is coupled to the second portion with a space therebetween to allow airflow through the space to cool the device.

9. The device of claim 1, further comprising a first portion of a communication system coupled to the controller, wherein the first portion is configured to communicate data wirelessly with a second portion of the communication system coupled to the receiver.

10. The device of claim 9, wherein the data includes one or more of current/voltage levels to supply to the transmitter, a charging status, a battery power level, and charging device/receiver identification information.

11. A wireless charging system, comprising:
a wireless charger that includes a first battery, a transmitter coupled to the first battery, a first controller coupled to the first battery and the transmitter, and a current sense circuit coupled to the transmitter and the first controller, wherein the first battery, the transmitter, and the first controller are further disposed within a housing;
a second battery; and
a receiver coupled to the second battery, wherein the receiver is identified by the first controller as one of a plurality of compatible receivers based on identification information exchanged wirelessly between the wireless charger and the receiver, wherein the first controller is configured to direct power from the first battery to the transmitter and wirelessly transmit the power to the receiver, and wherein the receiver receives the wirelessly transmitted power to charge the second battery, and wherein the controller is configured to use data from the current sense circuit to determine if the receiver is properly aligned with the transmitter and to wirelessly transmit power from the transmitter to the receiver only if the receiver is at least partially properly aligned with the transmitter.

12. The system of claim 11, further comprising a device that includes the second battery, the receiver, and a second controller coupled to the second battery and the receiver, wherein the second battery and the receiver are integrated into a single component, the second controller is configured to direct the wirelessly transmitted power from the receiver to charge the second battery, the wireless charger and the device are WPC compliant, and the wireless charger and the device utilize an inductive coupling to transfer and receive power wirelessly.

13. The system of claim 11, wherein the wireless charger further includes an electrical connection to receive power from an external power source, and wherein the first controller is configured to bypass the first battery and direct power from the external power source to the transmitter and wirelessly transmit the power from the external power source to the receiver when the electrical connection is receiving power from the external power source, and wherein the first controller is configured to direct power from the external power source to charge the first battery while simultaneously directing power from the external power source to the transmitter.

14. The system of claim 11, further comprising a first portion of a communication system associated with the wireless charger and a second portion of the communication system associated with the receiver and the second battery, wherein the first portion is configured to communicate data wirelessly with the second portion of the communication system.

15. The device of claim 14, wherein the data include charger/receiver identification information to identify compatible receivers that are allowed to be charged by the charger.

16. A method of wirelessly charging a device battery of a device, comprising the steps of:
providing a wireless charger that includes an internal power supply and a transmitter;
directing power from the internal power supply to the transmitter;

determining whether a receiver associated with the device is one of a plurality of compatible receivers based on identification information exchanged wirelessly between the wireless charger and the device;

determining, based on data received from a current sense circuit, whether the receiver is properly aligned with the transmitter;

wirelessly transmitting power from the transmitter if the receiver is found to be at least partially properly aligned with the transmitter;

receiving the wirelessly transmitted power at the receiver associated with a device; and directing the received power to operate the device.

17. The method of claim 16, further comprising the step of sensing if the device battery is fully charged, and wherein the steps of directing power from the internal power supply to the transmitter and wirelessly transmitting power from the transmitter are performed only if the receiver is properly aligned with the transmitter and the device battery is not fully charged.

18. The method of claim 16, further comprising the steps of selectively connecting the wireless charger to receive power from an external power source and simultaneously charging the internal power supply from the power received from the external power source and directing power received from the external power source to the transmitter only if the device battery is not fully charged, wherein the step of directing power received from the external power source to the transmitter bypasses the step of directing power from the internal power supply to the transmitter.

\* \* \* \* \*